United States Patent
Tokuoka et al.

(10) Patent No.: US 8,547,511 B2
(45) Date of Patent: Oct. 1, 2013

(54) LIQUID CRYSTAL DISPLAY PANEL

(75) Inventors: Taiyo Tokuoka, Aichi-ken (JP); Tetsuya Iizuka, Saitama-ken (JP); Kazuya Daishi, Saitama-ken (JP); Jin Hirosawa, Saitama-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 133 days.

(21) Appl. No.: 13/180,735

(22) Filed: Jul. 12, 2011

(65) Prior Publication Data

US 2012/0019755 A1 Jan. 26, 2012

(30) Foreign Application Priority Data

Jul. 22, 2010 (JP) .................................. 2010-165211

(51) Int. Cl.
 *G02F 1/1343* (2006.01)
(52) U.S. Cl.
 USPC ............ 349/128; 349/139; 349/142; 349/146
(58) Field of Classification Search
 None
 See application file for complete search history.

(56) References Cited

U.S. PATENT DOCUMENTS

| 7,742,135 | B2 | 6/2010 | Tago et al. |
| 2007/0200990 | A1 | 8/2007 | Hirosawa et al. |
| 2008/0192160 | A1 | 8/2008 | Yoshida et al. |
| 2009/0103021 | A1 | 4/2009 | Manabe et al. |
| 2009/0147201 | A1 | 6/2009 | Yoshida et al. |
| 2009/0147202 | A1* | 6/2009 | Ashizawa et al. ............. 349/139 |
| 2009/0296035 | A1* | 12/2009 | Hsiang et al. ................. 349/129 |
| 2011/0075083 | A1 | 3/2011 | Takeda et al. |

FOREIGN PATENT DOCUMENTS

| JP | 2006-323423 | * 11/2006 |
| JP | 2009-145424 | 7/2009 |

OTHER PUBLICATIONS

U.S. Appl. No. 13/369,057, filed Feb. 8, 2012, Hirosawa.
U.S. Appl. No. 13/405,799, filed Feb. 27, 2012, Hirosawa, et al.

* cited by examiner

*Primary Examiner* — Bumsuk Won
*Assistant Examiner* — Ryan Crockett
(74) *Attorney, Agent, or Firm* — Oblon, Spivak, McClelland, Maier & Neustadt, L.L.P.

(57) ABSTRACT

A liquid crystal display panel includes a plurality of pixels arranged in a first direction and a second direction orthogonally crossing with the first direction. A first alignment pattern is formed in the counter electrode. The first alignment pattern faces the pixel electrode and extending in the first direction. A second alignment pattern is formed in the counter electrode. The second alignment pattern also faces the pixel electrode and extends in the second direction intersecting with the first alignment pattern. An expanding alignment portion is arranged at the intersecting portion of the first alignment pattern and the second alignment pattern. The first and second alignment patterns are formed of alignment slits or alignment protrusions arranged in the counter substrate.

10 Claims, 13 Drawing Sheets

|  | "BRUISING" | TRANSMISSIVITY RATE |
| --- | --- | --- |
| FIRST EMBODIMENT | NO | 0.95 |
| SECOND EMBODIMENT | NO | 1.00 |
| COMPARATIVE EXAMPLE 1 | YES | 1.00 |
| COMPARATIVE EXAMPLE 2 | YES | 0.80 |

FIG. 17

LIQUID CRYSTAL DISPLAY PANEL

CROSS-REFERENCE TO RELATED APPLICATION

This application is based upon and claims the benefit of priority from Japanese Patent Application No. P2010-165211, filed Jul. 22, 2010, the entire contents of which are incorporated herein by reference.

FIELD

Embodiments described herein relate generally to a liquid crystal display panel.

BACKGROUND

Generally, a liquid crystal display device equipped with a liquid crystal display panel is well known as a display device. The liquid crystal display panel includes an array substrate, a counter substrate, and a liquid crystal layer held therebetween. In recent years, the liquid crystal display panel is required for improvement in the display quality such as an increase in contrast. The liquid crystal display panel using VA (Vertically Aligned) mode is known as the liquid crystal display panel. Moreover, the liquid crystal display panel using a MVA (Multi-domain Vertical Alignment) mode which has a wide viewing angle characteristic is also known as the liquid crystal display panel.

In the liquid crystal display panel using the MVA mode, a plurality of pixel electrodes is arranged on the array substrate apart from each other. The pixel electrodes have slits, respectively. A common electrode and protrusions are formed in a stripe shape on the counter substrate.

The protrusions and the slits form several domains where the directions of electric flux line differ mutually in the liquid crystal layer. For this reason, several domains where the alignment orientations of liquid crystal molecules differ mutually are formed in the liquid crystal layer corresponding to the pixel electrodes. Thereby, since the viewing angle is compensated, the liquid crystal display panel can achieve a wide viewing angle characteristic.

In the above liquid crystal display panel, the wide viewing angle is achieved by providing the alignment protrusions, etc. which control the alignments of the liquid crystal molecules. The transmissivity of the display panel is increased if the number of the alignment protrusions is decreased, or the alignment protrusion is made small. However, when the display panel is equipped with a touch panel function, and is pressed by fingers while moving, an undesirable trail of the picture is generated with the movement of the fingers ("bruising"). On the other hand, if many alignment protrusions or large alignment protrusions are arranged, the transmissivity is decreased.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

FIG. 17 is a table showing a relation of the occurrence of "bruising" and a transmissivity ratio among the embodiments, and first and second comparative examples.

DETAILED DESCRIPTION OF THE INVENTION

Figure 1:
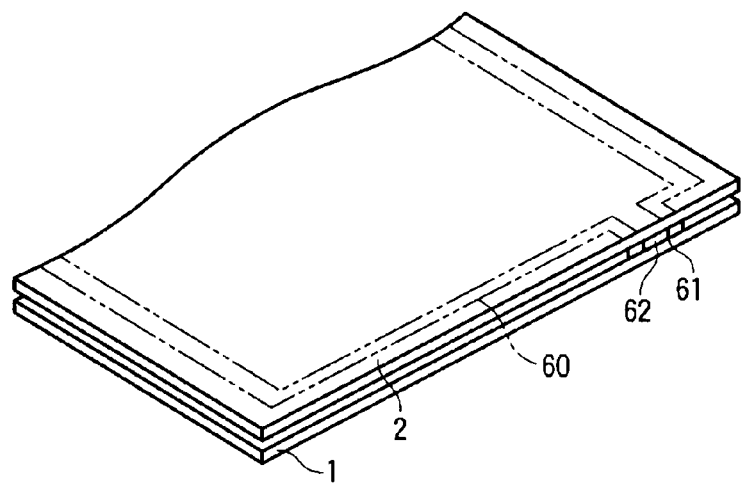
FIG. 1 is a perspective diagram showing a liquid crystal display panel according to one embodiment.

A liquid crystal display panel according to an exemplary embodiment of the present invention will now be described with reference to the accompanying drawings wherein the same or like reference numerals designate the same or corresponding portions throughout the several views.

According to one embodiment, a liquid crystal display panel having a plurality of pixels arranged in a first direction and a second direction orthogonally crossing with the first direction includes: an array substrate including a plurality of pixel electrodes arranged corresponding to the respective pixels and a first vertical alignment film formed on the pixel electrodes; a counter substrate arranged opposing the array substrate with a gap therebetween, the counter substrate including a counter electrode facing the pixel electrodes and a second vertical alignment film formed on the counter electrode; a liquid crystal layer held between the array substrate and the counter substrate; a first alignment pattern formed in the counter electrode, the first alignment pattern facing the pixel electrode and extending in the first direction; a second alignment pattern formed in the counter electrode and extending in the second direction, the second alignment pattern facing the pixel electrode and intersecting with the first alignment pattern; and an expanding alignment portion arranged at the intersecting portion of the first alignment pattern and the second alignment pattern.

Hereafter, the liquid crystal display panel according to one embodiment is explained in detail referring to drawings. As shown in FIG. 1 to FIG. 7, the liquid crystal display panel is equipped with an array substrate 1, a counter substrate 2 opposing the array substrate 1, and a liquid crystal layer 3 held between both substrates. The liquid crystal display panel includes a display region R in which the array substrate 1 and the counter substrate 2 overlaps each other, and a plurality of pixels 13 arranged in the shape of a matrix in the display region R. Each pixel 13 is formed of the overlapped array substrate 1 with the counter substrate 2 and the liquid crystal layer 3. The pixel 13 will be mentioned later.

As shown in FIG. 1 to FIG. 7, the array substrate 1 includes a glass substrate 10 as a transparent insulating substrate, for example. An undercoating layer 12 is formed on the glass substrate 10.

A plurality of signal lines 27 extending along a first direction Y and a plurality of scanning lines 19 extending along a second direction X that intersects perpendicularly with the first direction Y are arranged in the display region R. A plurality of auxiliary capacitance lines 21 is arranged on the glass substrate 10 in parallel with the scanning lines 19 which extend along the second direction X. In this embodiment, the auxiliary capacitance line 21 functions as a shield portion. Each region surrounded with two adjacent scanning lines 19 and two adjacent signal lines 27 is a region corresponding to each pixel 13.

Figure 2:
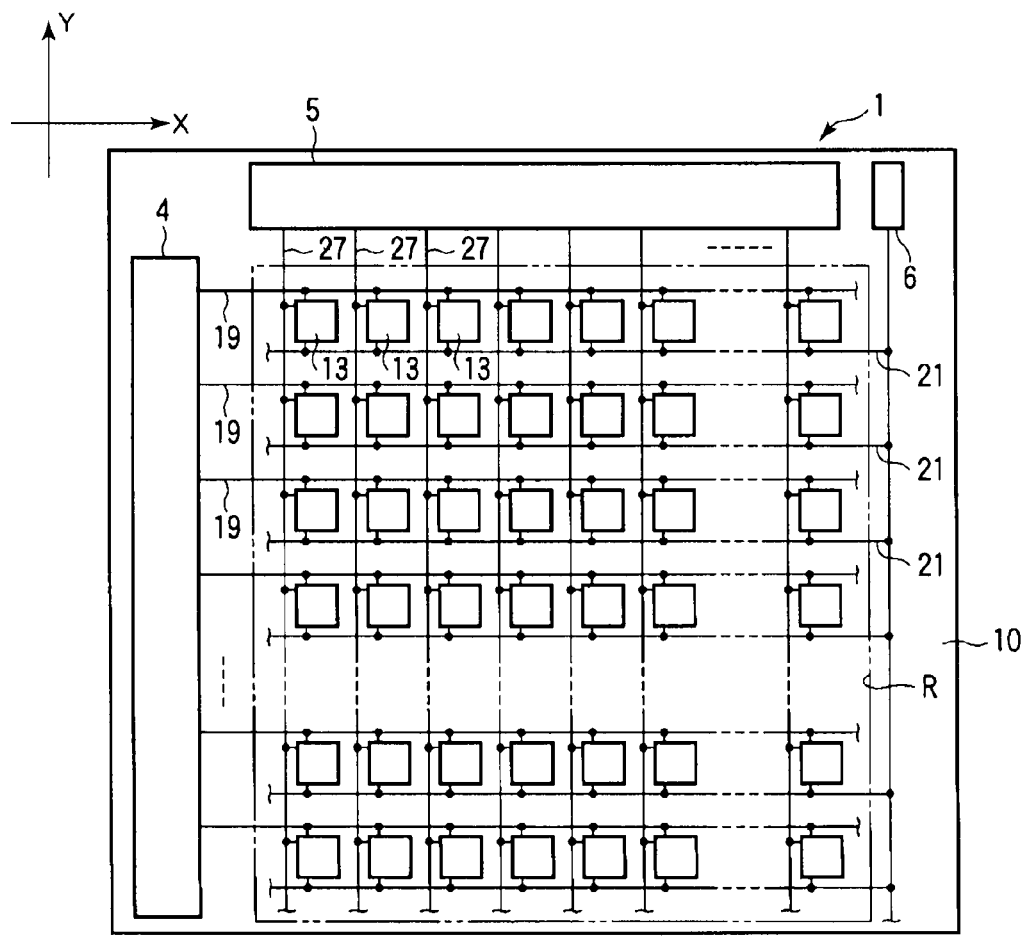
FIG. 2 is a plan view showing an array substrate shown in FIG. 1.

As shown in FIG. 2, a scanning line driver circuit 4, a signal line driver circuit 5, and an auxiliary capacitance line driver circuit 6 are formed in the outside of the display region R on the glass substrate 10. The scanning line driver circuit 4 is connected with the plurality of scanning lines 19 which extend to the outside of the display region R. The signal line driver circuit 5 is connected with the plurality of signal lines 27 which extend to the outside of the display region R. The auxiliary capacitance line driver circuit 6 is connected with the plurality of auxiliary capacitance lines 21 which extend to the outside of the display region R.

Next, a structure of the array substrate 1 forming the pixel 13 is explained by picking up one pixel 13. In addition, FIG. 4 is a figure showing an equivalent circuit of the pixel 13 as mentioned-above. As shown in FIG. 3 to FIG. 7, the pixel 13 includes a pixel electrode 34, a TFT (Thin Film Transistor) 14 as a switching element connected with the pixel electrode 34, and an auxiliary capacitance element 16. The pixel 13 has a long axis which extends in the first direction Y.

Figure 3:
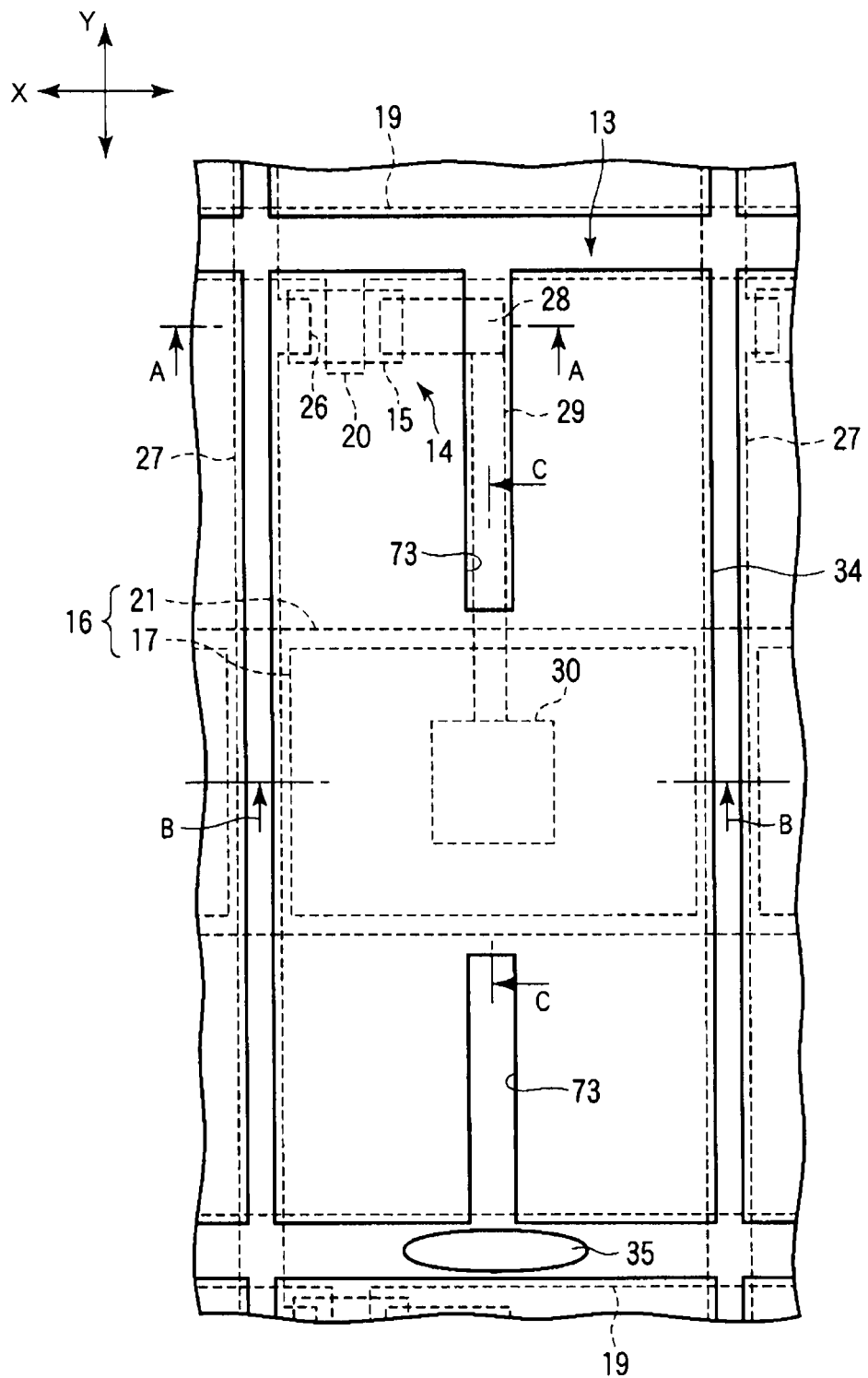
FIG. 3 is a plan view showing a portion of the array substrate shown in FIG. 1 and FIG. 2 by expanding.
Figure 4:
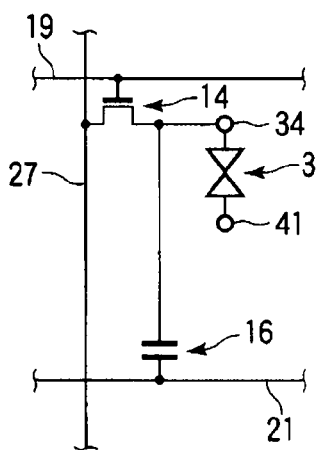
FIG. 4 is an equivalent circuit of a pixel shown in FIG. 2 and FIG. 3.

FIG. 3 is a plan view showing the pixel 13 shown in FIG. 2. The scanning line 19, a gate electrode 20, and the auxiliary capacitance line 21 are simultaneously formed with low resistance materials which have a light blocking effect, such as aluminum, molybdenum tungsten, etc. In this embodiment, the scanning line 19, the gate electrode 20, and the auxiliary capacitance line 21 are formed with molybdenum tungsten.

Each gate electrode 20 is formed overlapping with each semiconductor layer 15. Each auxiliary capacitance line 21 is formed overlapping with a plurality of auxiliary capacitance electrodes 17. The auxiliary capacitance electrode 17 and the auxiliary capacitance line 21 form the auxiliary capacitance element 16 through a gate insulating film 18 arranged therebetween.

An interlayer insulating film 22 is formed on the gate insulating film 18, the scanning line 19, the gate electrode 20, and the auxiliary capacitance line 21. A plurality of source electrodes 26, signal lines 27, drain electrodes 28, connection wirings 29, and contact electrodes 30 are formed on the interlayer insulating film 22.

The source electrode 26 and the signal line 27 are integrally formed, and are electrically connected mutually. The plurality of drain electrodes 28, connection wirings 29, and contact electrodes 30 are integrally formed, and are electrically connected mutually.

The source electrode 26, the signal line 27, the drain electrode 28, the connection wiring 29, and the contact electrode 30 are simultaneously formed of low resistance materials which have the light blocking effect, such as aluminum, molybdenum tungsten, etc. In this embodiment, the source electrode 26, the signal line 27, the drain electrode 28, the connection wiring 29, and the contact electrode 30 are formed with aluminum.

Figure 5:
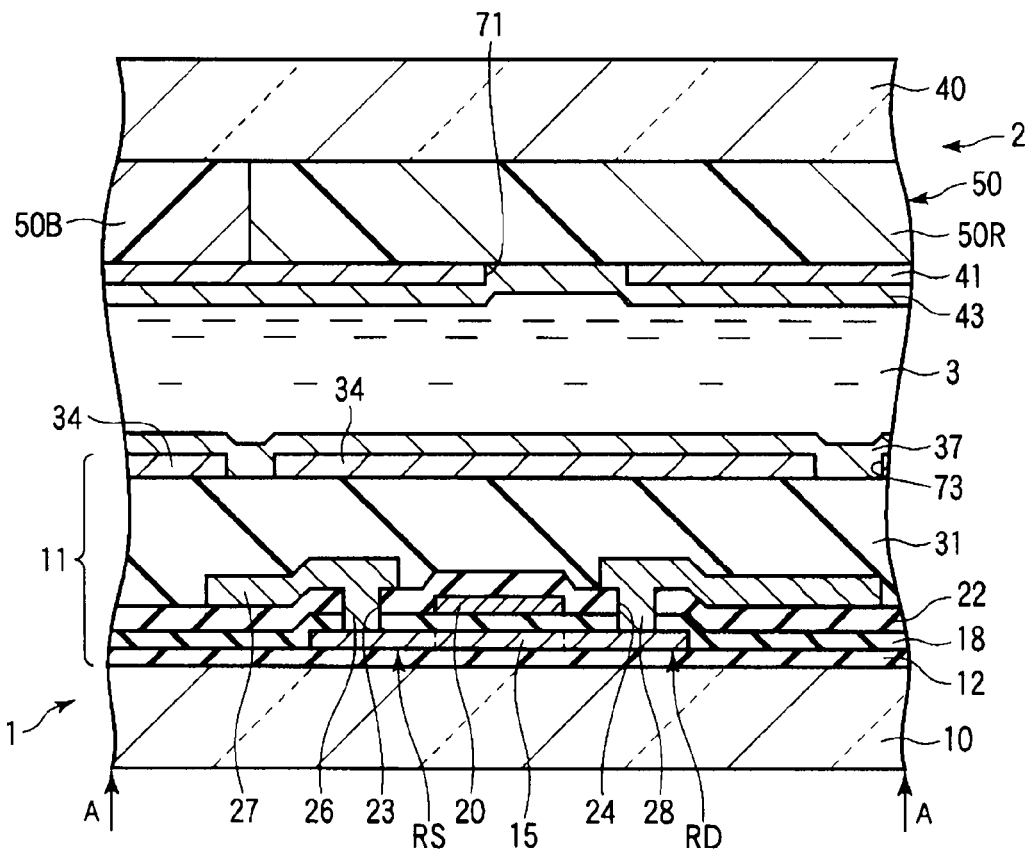
FIG. 5 is a cross-sectional view showing the liquid crystal display panel taken along line A-A shown in FIG. 3.
Figure 6:
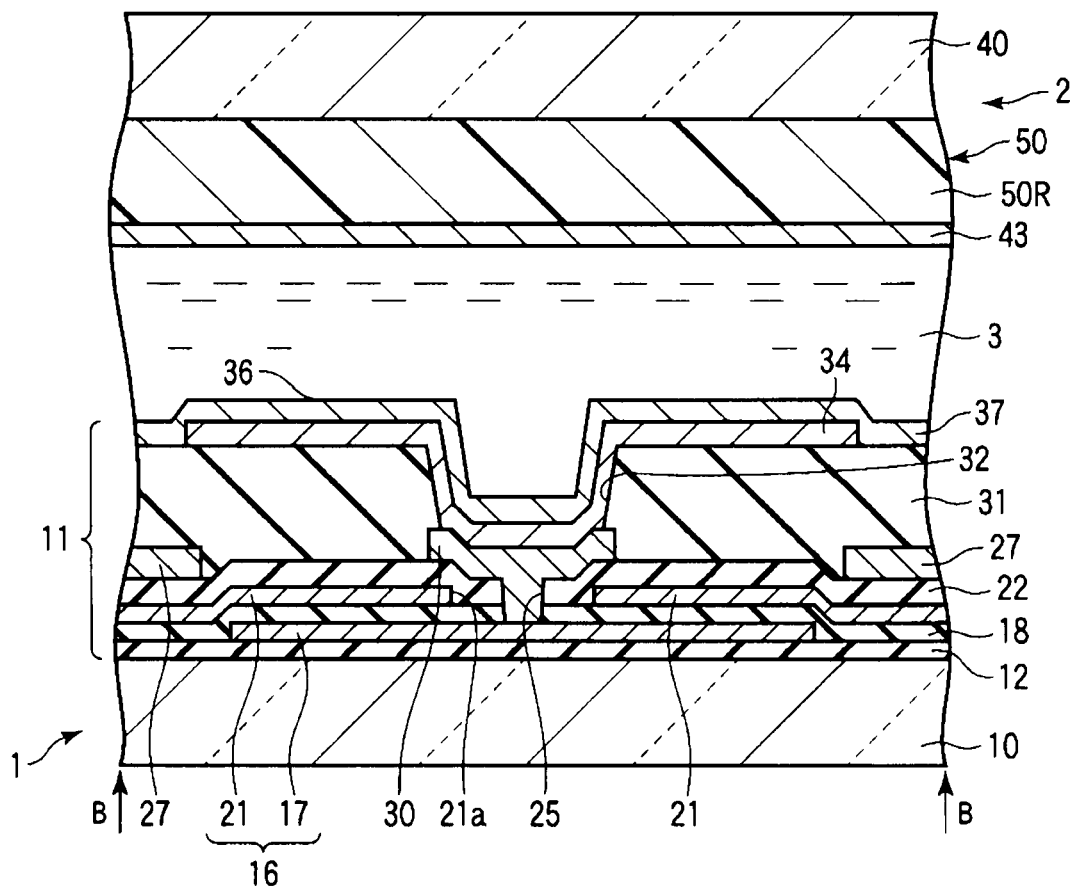
FIG. 6 is a cross-sectional view showing the liquid crystal display panel taken along line B-B shown in FIG. 3.
Figure 7:
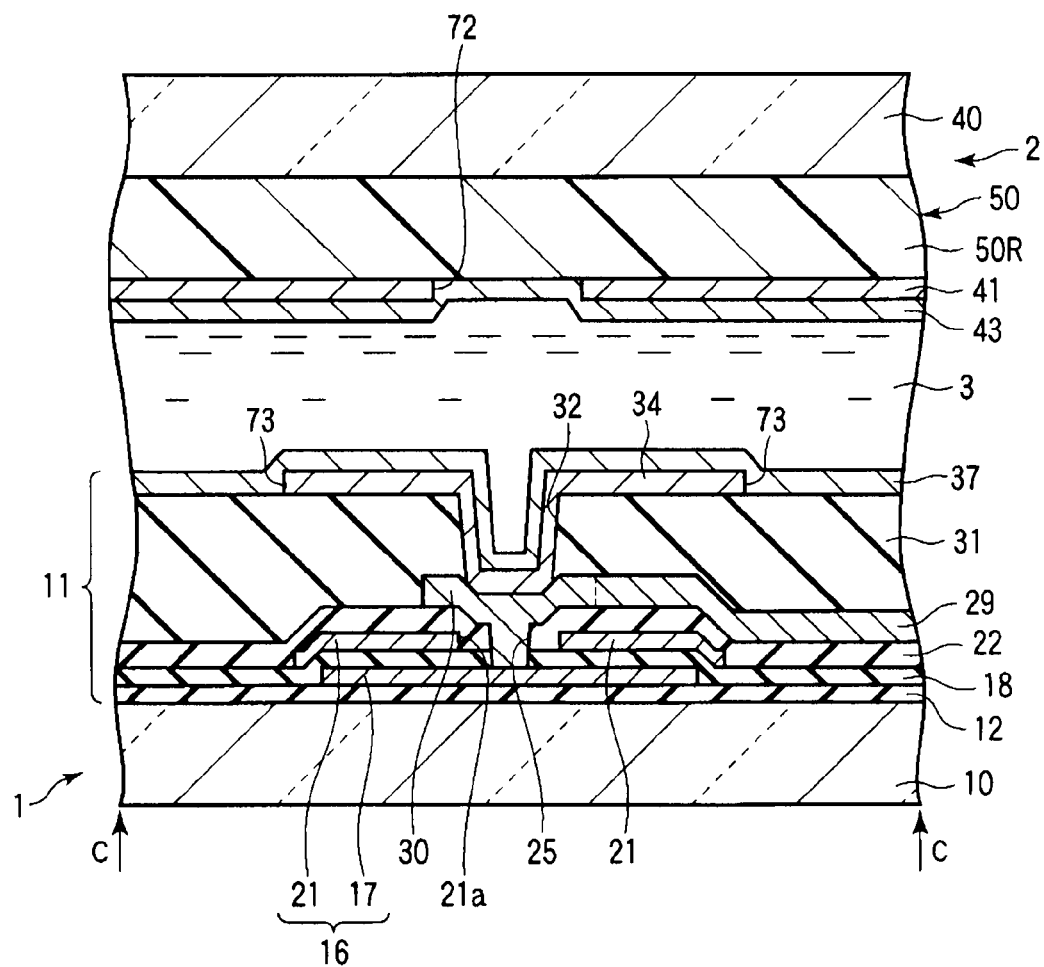
FIG. 7 is a cross-sectional view showing the liquid crystal display panel taken along line C-C shown in FIG. 3.
Figure 8:
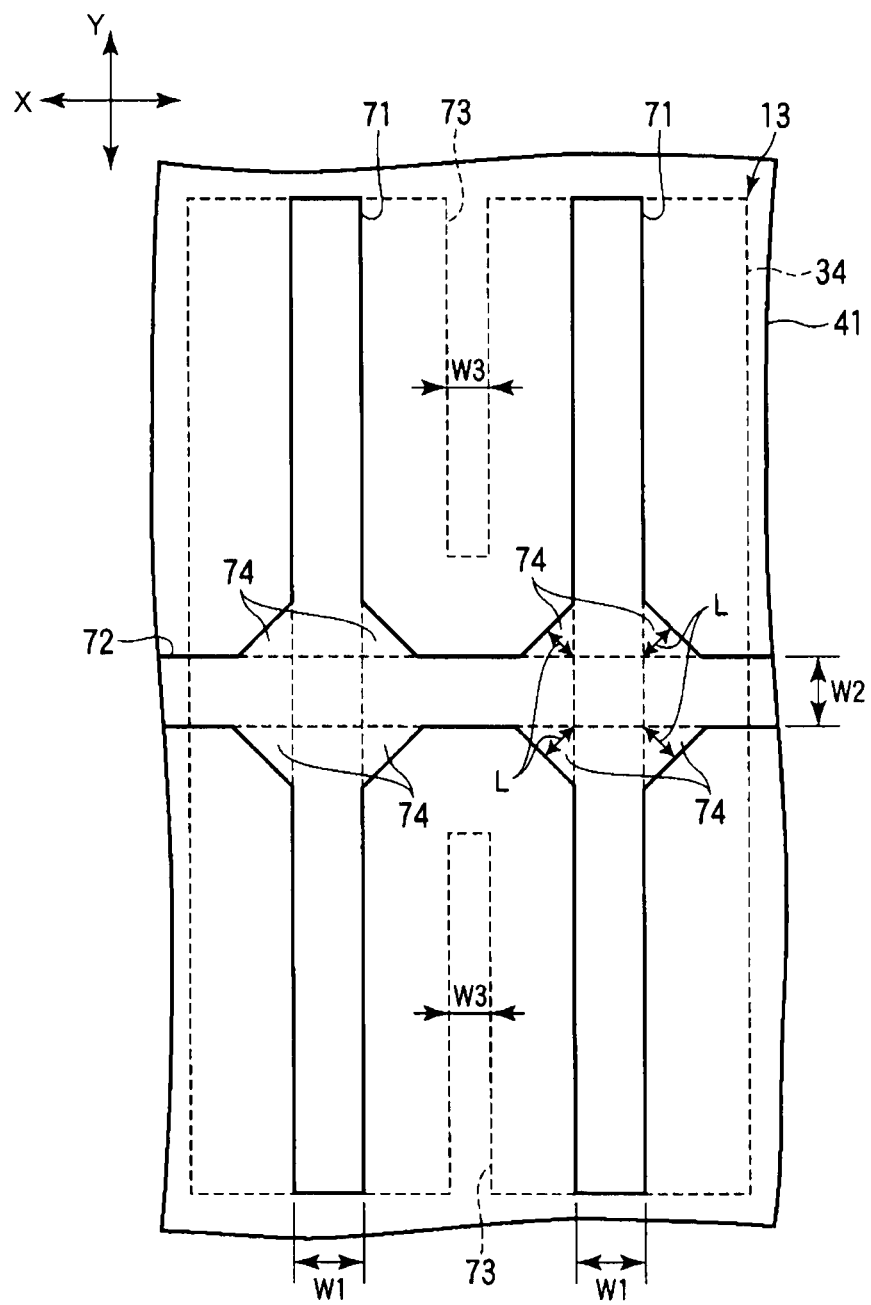
FIG. 8 is a plan view showing a pixel electrode, a counter electrode, first, second and third alignment slits 71, 72, and 73 and an expanding alignment portion 74 which respectively form one pixel of the liquid crystal display panel according to a first embodiment by looking from a counter substrate side.

FIG. 5 is a cross-sectional view showing the liquid crystal display panel taken along line A-A shown in FIG. 3. FIG. 6 is a cross-sectional view showing the liquid crystal display panel taken along line B-B shown in FIG. 3. Similarly, FIG. 7 is a cross-sectional view showing the liquid crystal display panel taken along line C-C shown in FIG. 3. The semiconductor layer 15 and the auxiliary capacitance electrode 17 are formed on the undercoating layer 12.

The semiconductor layer 15 and the auxiliary capacitance electrode 17 are simultaneously formed with the same material by patterning a semiconductor film formed on the undercoating layer 12. In this embodiment, the semiconductor layer 15 and the auxiliary capacitance electrode 17 are formed with poly-silicon in which impurities are doped.

The gate insulating film 18 is formed on the undercoating layer 12, the semiconductor layer 15, and the auxiliary capacitance electrode 17. The plurality of scanning lines 19, gate electrodes 20 respectively extending from a portion of the scanning lines 19, and auxiliary capacitance lines 21 are formed on the gate insulating film 18. In a region which overlaps with the auxiliary capacitance electrodes 17, a plurality of openings 21a is formed in the auxiliary capacitance line 21, respectively.

The source electrode 26 is electrically connected with a source region RS of the semiconductor layer 15 through a contact hole 23 which penetrates respective portions of the gate insulating films 18 and the interlayer insulating film 22. The drain electrode 28 is electrically connected with a drain region RD of the semiconductor layer 15 through a contact hole 24 which penetrates respective portions of the gate insulating films 18 and the interlayer insulating film 22.

The contact electrode 30 is electrically connected with the auxiliary capacitance electrode 17 through a contact hole 25 which penetrates respective portions of the gate insulating films 18 and the interlayer insulating films 22. The contact hole 25 penetrates along the opening 21a of the auxiliary capacitance line 21. For this reason, an insulated state between the contact electrode 30 and the auxiliary capacitance line 21 is maintained.

A planarization film 31 formed with transparent resin as an insulating film is formed on the interlayer insulating film 22, the source electrode 26, the signal line 27, the drain electrode 28, the connection wiring 29, and the contact electrode 30. The planarization film 31 has a plurality of contact holes 32 formed on the auxiliary capacitance line 21 and the contact electrode 30 so as to penetrate to the auxiliary capacitance line 21 and the contact electrode 30, respectively. In this embodiment, the planarization film 31 is formed in the display region R. In addition, a shield layer which is not illustrated is formed in the outside of the display region R instead of the planarization film 31. The shield layer is formed in the shape of a rectangle with materials having a light blocking effect, and is arranged so that the perimeter of the display region R is surrounded.

As described-above, a base layer 11 having the TFT 14, the auxiliary capacitance element 16, and the pixel electrode 34 is formed on the glass substrate 10. A plurality of pillar-shaped spacers 35 are formed on the base layer 11. In this embodiment, the pillar-shaped spacer 35 is formed on the planarization film 31 apart from the pixel electrode 34. A vertical alignment film 37 is formed on the base layer 11 and pillar-shaped spacers 35 as a first vertical alignment film.

Next, the counter substrate 2 is explained. As shown in FIG. 1 and FIG. 5 to FIG. 7, the counter substrate 2 includes a transparent insulating substrate 40, such as a glass substrate. A color filter 50 is formed on the glass substrate 40.

A color filter 50 has a plurality of red colored layers 50R, green colored layers and blue colored layers 50B which are not illustrated. Each colored layer is formed in the shape of a stripe, and extends along the first direction Y. The periphery of each colored layer overlaps with the signal line 27.

A counter electrode 41 is formed of transparent electric conductive materials, such as ITO on the color filter 50. The counter electrode 41 is arranged in common to the plurality of pixels 13. A vertical alignment film 43 is formed on the color filter 50 and the counter electrode 41 as a second vertical alignment film. The vertical alignment film 43 counters the vertical alignment film 37.

The array substrate 1 and the counter substrate 2 are arranged while holding a predetermined gap therebetween by the plurality of pillar-shaped spacers 35. The array substrate 1 and the counter substrate 2 are attached by a seal material 60 arranged between both substrates in the perimeter of the display region R. The liquid crystal layer 3 is formed in the region surrounded by the array substrate 1, the counter substrate 2, and the seal material 60. The liquid crystal layer 3 is formed with a negative type liquid crystal material. The liquid crystal molecules of the liquid crystal layer 3 have a negative dielectric constant anisotropy. A liquid crystal injecting mouth 61 is formed in a portion of the seal material 60, and the liquid crystal injecting mouth is sealed with a sealing element 62.

Next, the liquid crystal display panel according to the embodiments and comparative examples are explained.

First Embodiment

As shown in FIG. 3, and FIG. 5 to FIG. 9, in the liquid crystal display panel according to the first embodiment, the pixel electrode 34 is formed in the shape of a rectangle of 60 μm×190 μm. The liquid crystal display panel is equipped with an alignment pattern which regulates the alignment orientation of the liquid crystal molecules of the liquid crystal layer 3. The alignment pattern includes a pair of first alignment slits 71, a second alignment slit 72, and a third alignment slit 73, and an expanding alignment portion 74.

The pair of first alignment slits 71 extends in the first direction Y, respectively, and is arranged in parallel while keeping an interval in the second direction X mutually. The pair of first alignment slits 71 is respectively formed in the shape of a stripe. The width W1 of the first alignment slit 71 is 10 μm. Here, the both ends of the respective first alignment portions 71 are located in alignment with short ends of the pixel electrode 34.

The second alignment slit 72 is arranged extending along the second direction X. The second alignment slit 72 is formed in the shape of a stripe. The width W2 of the second alignment slit 72 is 10 μm. The second alignment slit 72 is arranged so that the pixel 13 (pixel electrode 34) may be equally divided into two portions in the first direction Y. The second alignment slit 72 overlaps with the auxiliary capacitance line 21.

The pair of first alignment slits 71 and the second alignment slit 72 are formed in the counter electrode 41 of the counter substrate 2. The pair of first alignment slits 71 is arranged so as to be separated between the adjacent pixels 13 in the first direction Y. On the contrast, the second alignment slit 72 is continuously formed in one between the adjacent pixels 13 arranged in the second direction X.

The third alignment slit 73 in the shape of a stripe is formed in the pixel electrode 34 on the array substrate 1. The third alignment slit 73 extends along the first direction Y, and is arranged between the pair of first alignment slits 71. The width W3 of the third alignment slit 73 is 6 μm. The third alignment slit 73 is arranged so that the pixel 13 (pixel electrode 34) is equally divided into two portions in the second direction X.

In this embodiment, a pair of third alignment slits 73 is formed in each pixel electrode 34. The pair of alignment slits 73 keeps an interval in the first direction Y interposing the second alignment slit 72 therebetween, and each end of the third alignment portions 73 is located in alignment with the short end of the pixel electrode 34. One of the pair of third alignment slits 73 overlaps with the above-mentioned connection wiring 29.

Here, the expanding alignment portions 74 are formed so as to expand in four directions from each of the intersections of the first alignment slit 71 and the second alignment slit 72. That is, eight expanding alignment portions 74 are formed in one pixel. In detail, four expanding alignment portions 74 are formed so that the respective expanding alignment portions 74 expand from four intersections of sides of the first alignment slit 71 and the second alignment slit 72. Two expanding alignment portions 74 are respectively formed so as to expand toward the third alignment slit 73 from the respective intersecting portions of the first alignment slit 71 and the second alignment slit 72.

The expanding alignment portion 74 is formed in the shape of a right triangle. In the expanding alignment portion 74, the minimum distance L between a right-angled point and an opposing oblique end of the right triangle is 3 μm. The expanding alignment portion 74 is integrally formed with the first alignment slit 71 and the second alignment slit 72. The expanding alignment portion 74 overlaps with the auxiliary capacitance line 21. The film thicknesses of the vertical alignment film 37 and the vertical alignment film 43 are respectively 70 nm. The clearance (cell gap) between the array substrate 1 and the counter substrate 2 is 3.8 μm.

Figure 9:
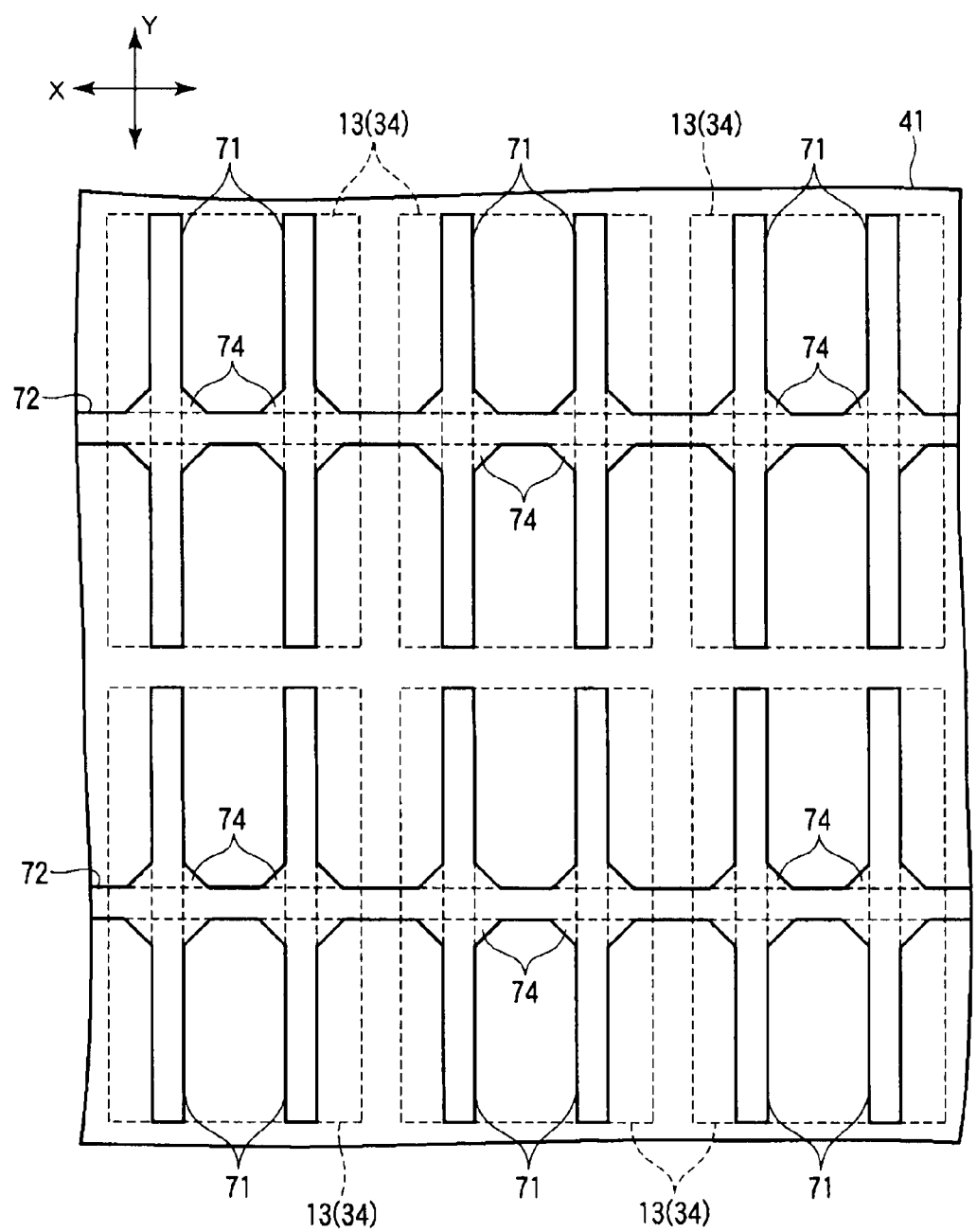
FIG. 9 is a plan view showing the counter electrode arranged in common to a plurality of pixels, and is a figure showing the alignment slits 71, 72 and 73 and the expanding alignment portion 74 according to the first embodiment.

FIG. 9 shows the counter electrode 41 in which the counter electrode 41 is arranged in common to the plurality of pixels 13. The alignment slits 71, 72 and the expanding alignment portion 74 are provided in each pixel 13.

Figure 10:
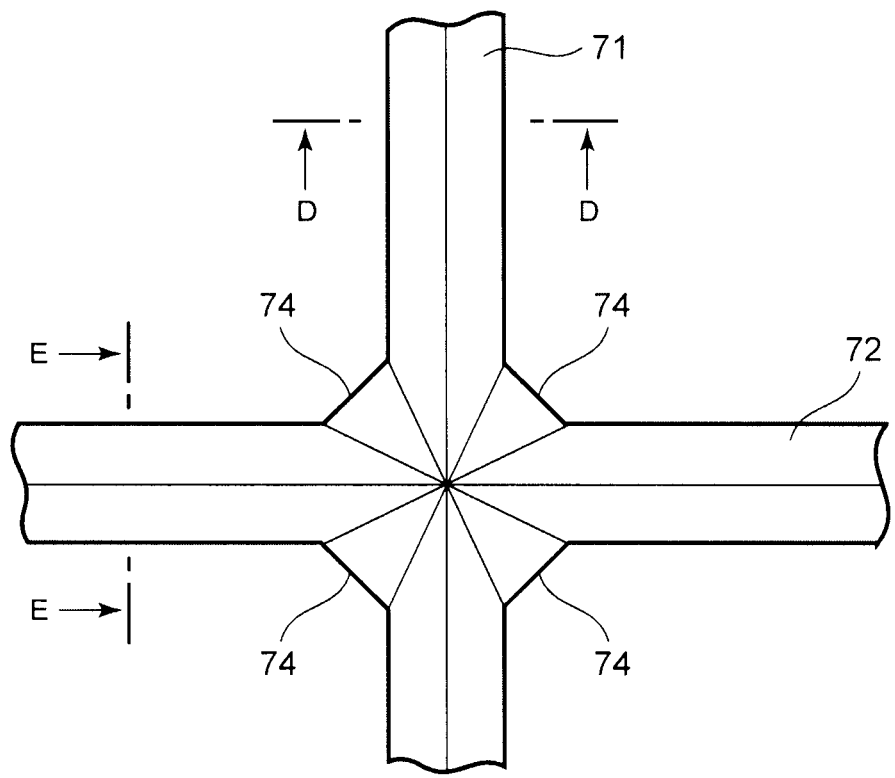
FIG. 10 shows an enlarged plan view showing an intersecting portion of a first alignment protrusion 71 and a second alignment protrusion 72 according a modification of the first embodiment.

FIG. 10 shows an enlarged plan view showing an intersecting portion of a first alignment protrusion 71 and a second alignment protrusion 72 according a modification of the first embodiment.

Figure 11:
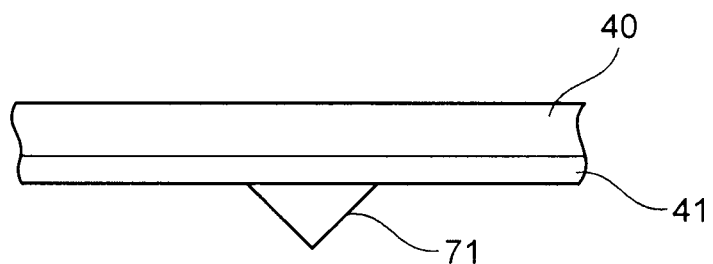
FIG. 11 is a cross-sectional view showing the first alignment protrusion 71 taken along line D-D shown in FIG. 10.
Figure 12:
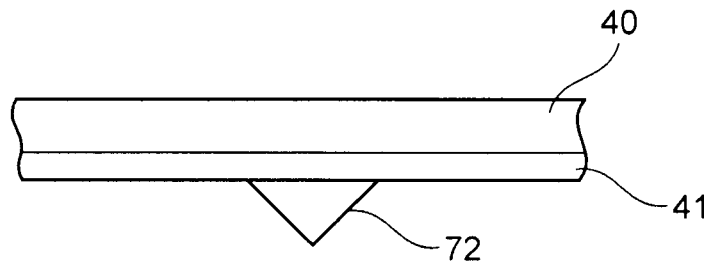
FIG. 12 is a cross-sectional view showing the second alignment protrusion 72 taken along line E-E shown in FIG. 10.

In this modification, the first alignment protrusion 71 and the second alignment protrusion 72 are used to regulate the alignment orientation of the liquid crystal layer 3 in place of the first and second alignment slits. The first and second alignment protrusions are formed of resin material in a stripe shape having a cross-section of a triangle shown in FIG. 11 and FIG. 12. Four expanding alignment protrusions 74 are formed at the intersecting portions of the first alignment protrusion 71 and the second alignment protrusions 72. FIG. 11 is a cross-sectional view showing the first alignment protrusion 71 taken along line D-D shown in FIG. 10. FIG. 12 is a cross-sectional view showing the second alignment protrusion 72 taken along line E-E shown in FIG. 10. The first and second alignment protrusions 71 and 72 are formed on the counter electrode 41.

Figure 13:
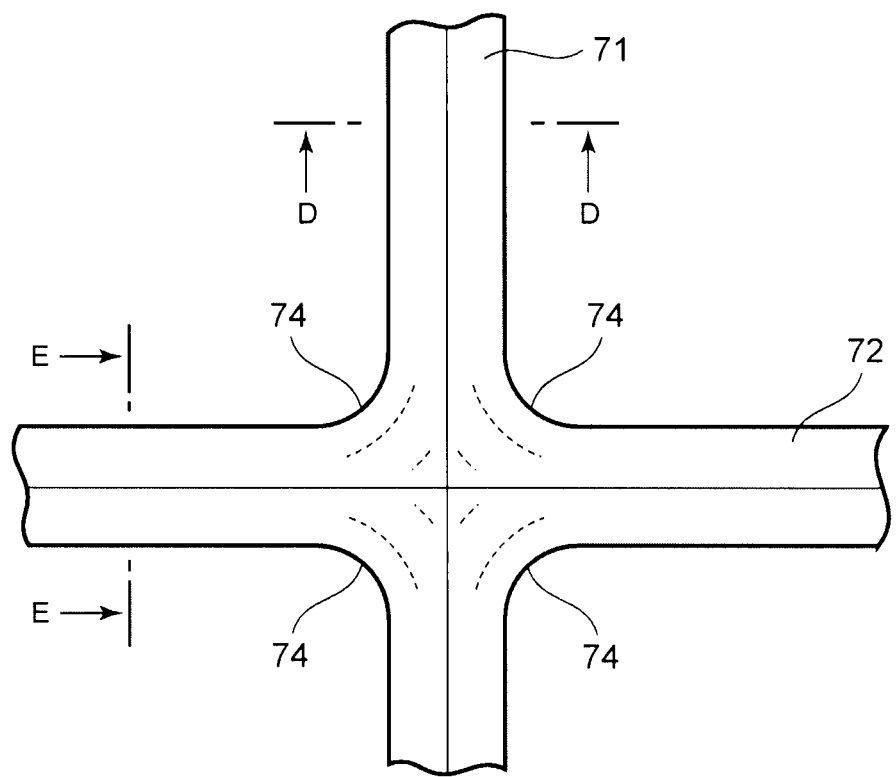
FIG. 13 shows an enlarged plan view showing an intersecting portion of the first alignment protrusion 71 and the second alignment protrusion 72 according to another modification of the first embodiment.

FIG. 13 shows an enlarged plan view showing an intersecting portion of the first alignment protrusion 71 and the second alignment protrusion 72 according to another modification of the first embodiment. In this modification, the shape of the expanding alignment protrusions 74 is different from that of the first modification shown in FIG. 10. That is, in this second modification, the side surfaces of the expanding alignment protrusion 74 are rounded.

In this embodiment, while the first alignment slit (alignment protrusion) 71, the second alignment slit (alignment protrusion) 72, and the expanding alignment portion 74 (alignment slit, protrusion) are formed in the counter electrode 41, it is possible to arrange the first alignment slit (alignment protrusion) 71, the second alignment slit (alignment protrusion) 72, and the expanding alignment portion (alignment slit, protrusion) 74 in the pixel electrode 34. In the case, the third alignment slit (alignment protrusion) is formed in the common electrode 41.

Second Embodiment

Figure 14:
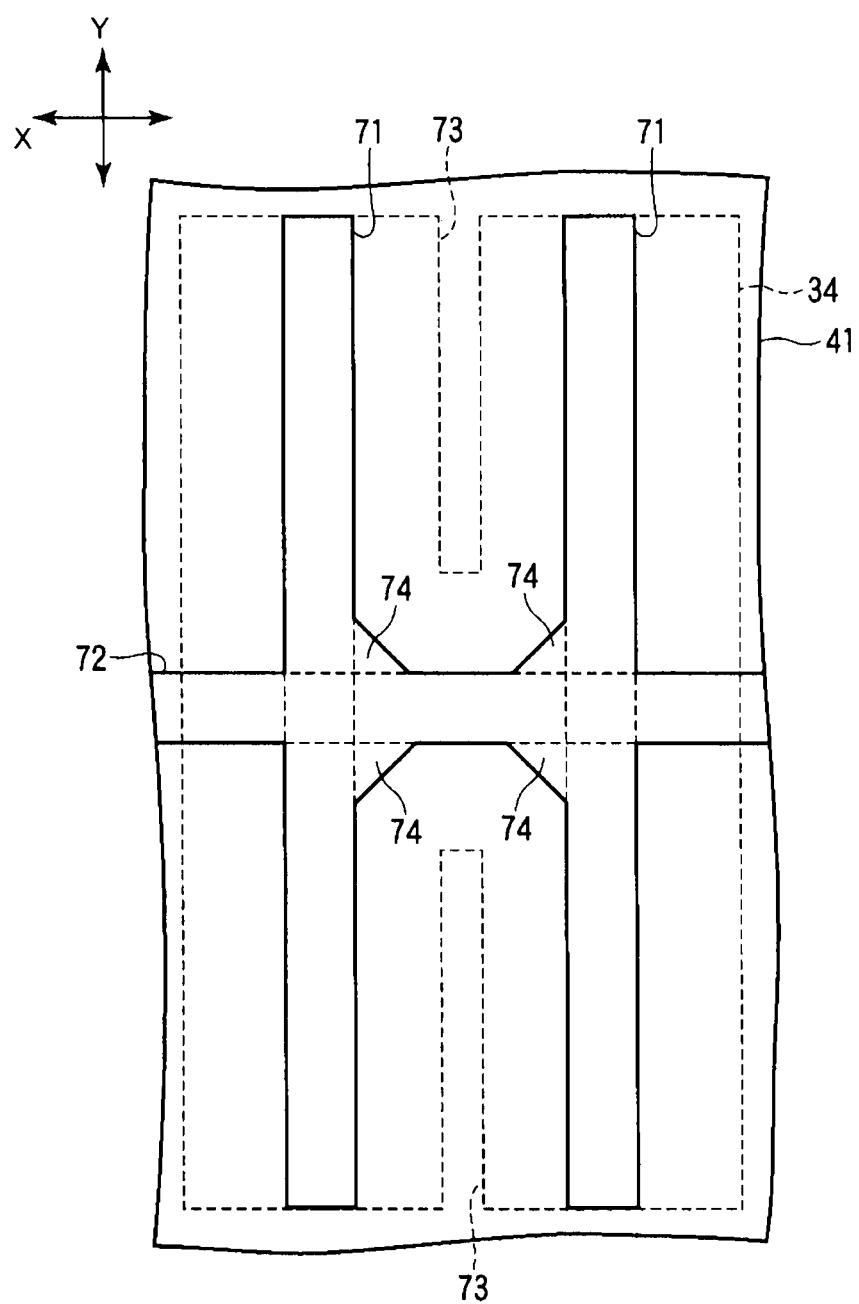
FIG. 14 is a plan view showing a pixel electrode, a counter electrode, and first, second and third alignment slits 71, 72 and 73, and an expanding alignment portion 74 which respectively form one pixel of the liquid crystal display panel according to a second embodiment by looking from a counter substrate side.

FIG. 14 is a plan view showing the liquid crystal display panel according to a second embodiment. The pixel electrode 34, the counter electrode 41, and the alignment slits 71, 72 and 73, the expanding alignment portion 74 respectively form one pixel of the liquid crystal display. As shown in FIG. 14, the expanding alignment portions 74 are formed only at the intersections of sides of the first alignment slits 71 and the second alignment slit 72, which counters the third alignment slit 73. That is, two expanding alignment portions 74 are formed for each intersection. In addition, the liquid crystal display panel of this embodiment is formed like the liquid crystal display panel according to the first embodiment except the above point.

Third Embodiment

Figure 15:
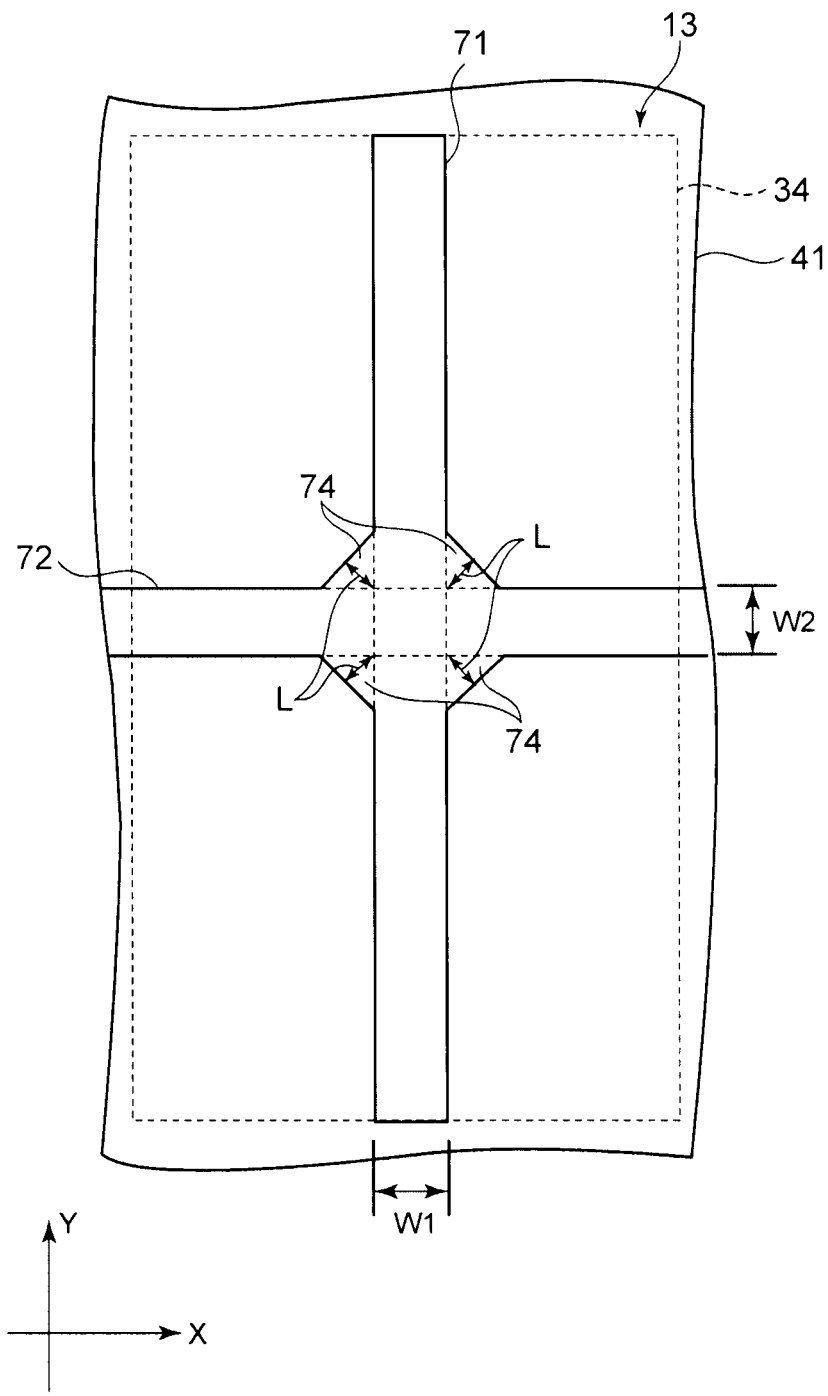
FIG. 15 is a plan view showing a pixel electrode, a counter electrode, first and second alignment slits 71 and 72, and an expanding alignment portion 74 which respectively form one pixel of the liquid crystal display panel according to a third embodiment by looking from a counter substrate side.

As shown in FIG. 15, in the liquid crystal display panel according to the third embodiment, the liquid crystal display panel includes an alignment pattern which regulates the alignment orientation of the liquid crystal molecules of the liquid crystal layer 3. The alignment pattern includes a first alignment slit 71, a second alignment slit 72, and an expanding alignment portion 74. In this embodiment, only one first alignment slit 71 is formed, and the third alignment slit in the first embodiment is not provided in each pixel 13.

The first alignment slit 71 extends in the first direction Y. The first alignment slit 71 is formed in the shape of a stripe. The width W1 of the first alignment slit 71 is 10 µm. Here, the both ends of the first alignment slit 71 are respectively located in alignment with short ends of the pixel electrode 34.

The second alignment slit 72 is arranged extending along the second direction X. The second alignment slit 72 is formed in the shape of a stripe. The width W2 of the second alignment slit 72 is 10 µm. The second alignment slit 72 is arranged so that the pixel 13 (pixel electrode 34) may be equally divided into two portions in the first direction Y. The second alignment slit 72 overlaps with the auxiliary capacitance line 21.

The first alignment slit 71 and the second alignment slit 72 are arranged in the counter electrode 41 on the counter substrate 2. The first alignment slit 71 is formed so as to be separated between the adjacent pixels in the first direction Y. On the contrast, the second alignment slit 72 is continuously formed in one between the adjacent pixels 13 arranged in the second direction X.

Here, the expanding alignment portions 74 are formed so as to expand in the four directions from the intersection of the first alignment slit 71 and the second alignment slit 72. In detail, four expanding alignment portions 74 are formed so that the respective expanding alignment portions 74 expand from the four intersections of sides of the first alignment slit 71 and the second alignment slit 72.

Figure 16:
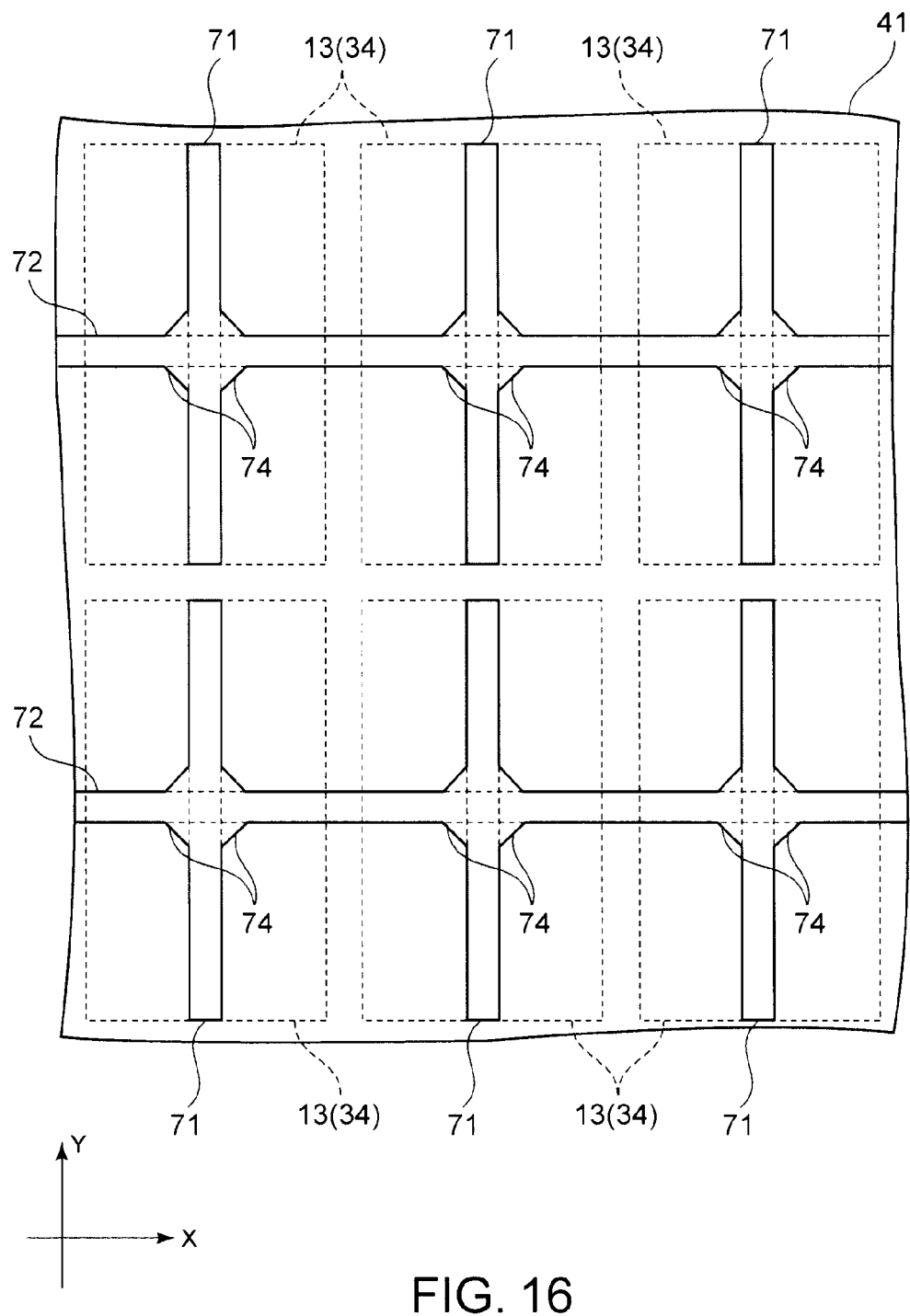
FIG. 16 is a plan view showing the counter electrode according to the third embodiment in which the counter electrode is arranged in common to a plurality of pixels, and is a figure showing the alignment slits 71 and 72, and the expanding alignment portion 74.

FIG. 16 shows the counter electrode 41 in which the counter electrode 41 is arranged in common to the plurality of pixels 13. The alignment slits 71 and 72, and the expanding alignment portion 74 are provided in each pixel 13.

In this embodiment, while the alignment slits are used as an alignment pattern, the alignment protrusions may be used in place of the alignment slits as described in the first embodiment as shown in FIG. 10 to FIG. 13.

In this embodiment, while the first alignment slit (alignment protrusion), and the second alignment slit (alignment protrusion) 72, and the expanding alignment portion 74 (alignment slit, protrusion) are formed in the counter electrode 41, it is possible to form the first alignment slit (alignment protrusion) 71, the second alignment slit (alignment protrusion) 72, and the expanding alignment portion (alignment slit, protrusion) 74 in the pixel electrode 34.

Comparative Example 1

The expanding alignment portion 74 is not formed in the liquid crystal display panel of the comparative example 1. In addition, the liquid crystal display panel of the comparative example 1 is formed like the liquid crystal display panel of the first embodiment except for the expanding alignment portion 74.

Comparative Example 2

In the liquid crystal display panel of the comparative example 2, the width W1 of the first alignment slit 71 and the width W2 of the second alignment slit 72 are 12 µm, respectively. In addition, the liquid crystal display panel of the comparative example 2 is formed like the liquid crystal display panel of the comparative example 1 except for the widths of the alignment slits.

Then, the inventors investigated the occurrence of the "bruising" and the transmissivity rate of the liquid crystal display panel with respect to the first and second embodiments, and the comparative example 1 and the comparative example 2, respectively. In addition, with respect to the transmissivity rate, a relative evaluation was made by setting the transmissivity ratio of the comparative example 1 to 1.00 as a reference.

As shown in FIG. 17, in the liquid crystal display panel according to the first and second embodiments, there was no "bruising" in the displayed picture, but in the liquid crystal display panel of the comparative example 1 and the comparative example 2, the "bruising" occurred in the displayed picture. Moreover, in the liquid crystal display panels of the first and second embodiments, although the expanding alignment portion 74 is formed, the decrease in transmissivity rate could be suppressed, and almost the same transmissivity rate was able to be obtained. However, the liquid crystal display panel of the comparative example 2 turns out that the transmissivity rate is falling compared with the liquid crystal display panel of the comparative example 1. That is, the transmissivity rate is lowered because the widths W1 and W2 of the first and second alignment slits are made larger.

In the liquid crystal display panel according to the embodiments, the first alignment slit (protrusion) 71 and second alignment slit (protrusion) 72 are formed in the counter electrode 41 so as to cross each other. Further, the expanding alignment portion 74 (slits, protrusions) is formed at the intersections of the first alignment slit (protrusion) 71 and the second alignment slit (protrusion) 72. Thereby, the alignment regulation strength in the liquid crystal display panel can be increased more, and a stabilized alignment operation is achieved. The above merit is substantially the same as the number of slits (protrusions) in the shape of a stripe is increased in the pixel electrode 13 or the counter electrode 41.

The expanding alignment portion 74 is formed on the auxiliary capacitance line 21 in piles. Thus, a decrease in the transmissivity can be suppressed by limiting the position in which the expanding alignment portion 74 is formed. Therefore, the liquid crystal display panel excellent in transmissivity can be obtained.

For example, regarding the third alignment slit (protrusion) 73, at least one alignment slit (protrusion) 73 may be arranged for each pixel 13. In this case, the third alignment slit (protrusion) 73 may cross the second alignment slit (protrusion) 72. Further, both ends of the third alignment slits (protrusion) 73 may be arranged so as to keep an interval from the short ends (periphery of the pixel 13) of the pixel electrode 34. In addition, even if various forms of the expanding alignment portions 74 can be adopted, the effect as mentioned-above can be acquired.

The both ends of the first alignment slit (protrusion) 71 may be located in the outside of the above-mentioned pixel electrode 34 beyond the short end (periphery of the pixel 13) of the pixel electrode 34, or may be arranged on the above-mentioned pixel electrode 34 so as to keep an interval from the short end (periphery of the pixel 13) of the pixel electrode 34.

The second alignment slit (protrusion) 72 may be formed so as to be divided between the adjacent pixels in the second direction X. In this case, both ends of the second alignment slit (protrusion) 72 may be located in the outside of the above-mentioned pixel electrode 34 beyond the long end (periphery of the pixel 13) of the pixel electrode 34, or may be arranged on the pixel electrode 34 while keeping an interval from the long ends (periphery of the pixel 13) of the pixel electrode 34.

As mentioned above, the first alignment slit 71, the second alignment slit 72, the third alignment slit 73, and the expanding alignment portion 74 may be replaced with insulating alignment protrusions formed on the pixel electrode 34 or the counter electrode 41. In this case, the above-mentioned protrusions formed of the insulating materials may be integrally formed for the first and second alignment protrusions.

In the above embodiments, the shape of the slits and the protrusions which form the alignment patterns is shown as examples. Therefore, various shapes of the slits and the protrusions can be applied to this invention.

While certain embodiments have been described, these embodiments have been presented by way of embodiment only, and are not intended to limit the scope of the inventions.

In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall with the scope and spirit of the inventions.

What is claimed is:

1. A liquid crystal display panel including a plurality of pixels arranged in a first direction and a second direction orthogonally crossing with the first direction, comprising:

an array substrate including a plurality of pixel electrodes arranged corresponding to the respective pixels and a first vertical alignment film formed on the pixel electrodes;

a counter substrate arranged opposing the array substrate with a gap therebetween, the counter substrate including a counter electrode facing the pixel electrodes and a second vertical alignment film formed on the counter electrode;

a liquid crystal layer held between the array substrate and the counter substrate;

a pair of first alignment patterns formed in the counter electrode, the pair of first alignment patterns facing the pixel electrode and extending in the first direction in parallel;

a second alignment pattern formed in the counter electrode and extending in the second direction, the second alignment pattern facing the pixel electrode and intersecting with the first alignment patterns;

a third alignment pattern formed in the pixel electrode, the third alignment pattern facing the counter electrode and extending in the first direction between the pair of the first alignment patterns; and an expanding alignment portion arranged at intersecting portions of the pair of first alignment patterns and the second alignment pattern, wherein the expanding alignment portion is formed only at intersections facing the third alignment pattern and is not formed at the intersections facing an end of the pixel electrode.

2. The liquid crystal display panel according to claim 1, wherein the expanding alignment portion expands toward the third alignment pattern.

3. The liquid crystal display panel according to claim 1, wherein the pair of first alignment patterns and the second alignment pattern are formed of alignment slits in the counter electrode, and the expanding alignment portion is formed by expanding from the crossed slits at the intersecting portions.

4. The liquid crystal display panel according to claim 1, wherein the pair of first alignment patterns and second alignment pattern are formed of alignment protrusions in the shape of a stripe, and the expanding alignment portion is formed of a protrusion by expanding from the crossed protrusions at the intersecting portions.

5. The liquid crystal display panel according to claim 1, wherein the pair of first alignment patterns is arranged so as to be separated from adjacent pixels, and the second alignment pattern is continuously formed between adjacent pixels.

6. A liquid crystal display panel including a plurality of pixels arranged in a first direction and a second direction orthogonally crossing with the first direction, comprising:

an array substrate including a plurality of pixel electrodes arranged corresponding to the respective pixels and a first vertical alignment film formed on the pixel electrodes;

a counter substrate arranged opposing the array substrate with a gap therebetween, the counter substrate including a counter electrode facing the pixel electrodes and a second vertical alignment film formed on the counter electrode;

a liquid crystal layer held between the array substrate and the counter substrate;

a pair of first alignment patterns formed in the pixel electrode, the pair of first alignment patterns facing the counter electrode and extending in the first direction in parallel;

a second alignment pattern formed in the pixel electrode and extending in the second direction, the second alignment pattern facing the counter electrode and intersecting with the pair of the first alignment patterns;

a third alignment pattern formed in the counter electrode, the third alignment pattern facing the pixel electrode and extending in the first direction between the pair of the first alignment patterns; and an expanding alignment portion arranged at intersecting portions of the pair of first alignment patterns and the second alignment pattern, wherein the expanding alignment portion is formed only at intersections facing the third alignment pattern and is not formed at the intersections facing an end of the pixel electrode.

7. The liquid crystal display panel according to claim 6, wherein the expanding alignment portion expands toward the third alignment pattern.

8. The liquid crystal display panel according to claim 6, wherein the pair of first alignment patterns and the second alignment pattern are formed of alignment slits in the pixel electrode, and the expanding alignment portion is formed by expanding from the crossed slits at the intersecting portions.

9. The liquid crystal display panel according to claim 6, wherein the first and second alignment patterns are formed of alignment protrusions in the shape of a stripe, and the expanding alignment portion is formed of a protrusion by expanding from the crossed alignment protrusions at the intersecting portions.

10. The liquid crystal display panel according to claim 6, wherein the pair of first alignment patterns are arranged so as to be separated from adjacent pixels, and the second alignment pattern is continuously formed between the adjacent pixels.

* * * * *